Aug. 15, 1950

A. M. PETERSON 2,518,634

FISHING APPLIANCE

Filed Jan. 18, 1946

Inventor
Arthur M. Peterson

By
Attorneys

Patented Aug. 15, 1950

2,518,634

UNITED STATES PATENT OFFICE 2,518,634

FISHING APPLIANCE

Arthur M. Peterson, Perry, Iowa; Olive Peterson administratrix of said Arthur M. Peterson, deceased Application January 18, 1946, Serial No. 642,074

1 Claim. (Cl. 43—44.92)

The invention relates to a fishing appliance, and more particularly to a device adapted for the attachment of sinkers or bobbers to a fishline.

A primary object of this invention is the provision of such a device whereby a fishline may be attached to a metal sinker, or alternatively to a cork bobber or similar device, without the necessity of unthreading the line from the pole, or alternatively of removing the hook therefrom, the attachment being accomplished without the necessity of inserting an end of the line through any aperture.

An additional object of the invention is the provision of such a device which may be readily associated with any sinker or bobber, and which, when so associated, may have the fishing line readily affixed thereto or associated therewith.

Still another object of the invention is the provision of such a device whereby the adjustment of the position of the sinker or bobber on the line may be readily obtained merely by providing slack in the line.

A further object of the invention is the provision of such a device which may be readily and inexpensively constructed from a single looped piece of wire.

Other objects will in part be obvious and in part be pointed out as the description of the invention proceeds and shown in the accompanying drawing wherein there is disclosed a preferred embodiment of this inventive concept.

In the drawing:

Figure 1 is a side elevational view of one form of the device embodying features of the instant invention shown in association with a sinker or the like.

Similar reference characters refer to similar parts throughout the several views of the drawing.

Figure 2:
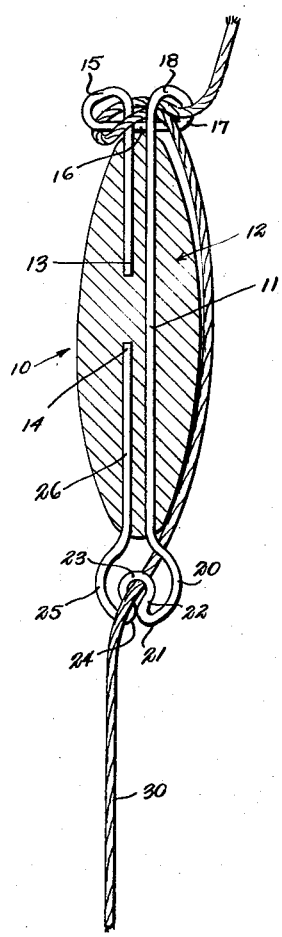
Figure 2 is a sectional view taken substantially along the line 2—2 of Figure 1 as viewed in the direction indicated by the arrows, and disclosing the method of associating a fishline therewith.
Figure 1:
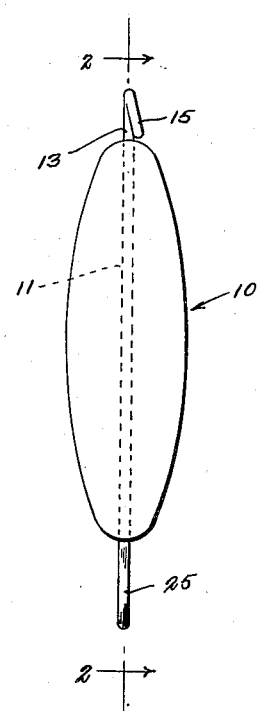
Figure 3:
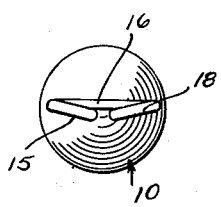
Figure 3 is a top plan view of the device.

Referring now to the drawing, there is generally indicated at 10, a body which may be either a conventional sinker or bobber of any desired type and shape which may be provided with a longitudinally extending bore, or alternatively as in the case of the conventional lead sinker, a longitudinally extending slot by means of which the device may be closed or clamped about a line or the like. Positioned within the longitudinally disposed bore or slot, and adapted to be secured thereto in any desired manner is the shank 11 of a continuous wire member, generally indicated at 12, the opposite ends of which may terminate in relatively juxtaposed position, as indicated at 13 and 14, within the bore or slot of the device 10. The wire 13 is bent as best shown in Figure 2, at a point spaced from the end 13, and above the body 10, to form an outwardly disposed loop, as indicated at 15, the lowermost portion of which terminates in a transversely extending member 16, which extends to a point 17, from which it is bent inwardly as at 18 to form a reverse loop corresponding to the loop 15, from which the shank 11 extends downwardly through the bore in the body 10. Thus it will be seen that there are provided two oppositely disposed substantially identical loops 15 and 18, at the upper extremity of the device, through which a line may be passed in a manner to be more fully described hereinafter.

As previously mentioned, the shank 11 extends substantially the full length of the body 10, and terminates in an outwardly bowed portion 20, which in turn terminates in a point 21 from which a reentrant portion 22 is looped as at 23 to form an interior loop. The loop 23 terminates at its opposite extremity in a point 24, relatively juxtaposed to the point 21, from which an arcuate bowed portion 25 leads to a reentrant shank 26 terminating in the end 14.

In the preferred embodiment of this inventive concept it may here be pointed out that the wire member 12 is preferably comprised of resilient material, in such manner that when it is bent relatively out of shape, to a not too extensive degree, as by the insertion of a fishline 30 into the various loops thereof in a manner to be more fully pointed out hereinafter, the device will resume its normal shape due to the resiliency thereof.

In the assembly of the device on a line, the fishline 30 is first interposed between the points 21 and 24, into the loop 23, where due to the resiliency of the wire previously discussed, it will be retained within loop 23. A portion of the line 30 adjacent the upper end of the sinker or bobber 10 is folded upon itself to form a loop and this folded or looped portion is passed through the loop 18 and then looped about the loop 15. When the line is pulled taut the sinker or bobber 10 will be readily maintained in the desired position thereon, due to the interengagement of the line within the loops 15 and 18, but conversely when adjustment of the position of the member 10 is desired, by the provision of slack in the line 30 the body 10 may be moved therealong to any desired relative position.

From the foregoing it will now be seen that there is herein provided a device accomplishing all the objects of this invention, and others, including many advantages of great practical utility and commercial importance.

As many embodiments may be made of this inventive concept, and as many modifications may be made in the embodiment hereinbefore shown and described, it is to be understood that all matter herein is to be interpreted merely as illustrative and not in a limiting sense.

I claim:

A fishing plug or the like for attachment to a fishing line, comprising an elongated body portion, and a line attaching device carried by the body portion for adjustably securing the plug to the line, said line attaching device including a unitary section of wire including a straight longitudinal shank embedded centrally within the body portion and extending for the entire length of the body portion and passing through the opposite ends of the body portion, said shank being bent at one end of the body portion to form an outer large loop, the loop being formed at its forward end to provide an inner small loop arranged within the large loop and substantially concentric therewith, the small loop being integrally connected with the large loop to form opposed resilient contacting sides which spread apart to permit the line to enter laterally into the small loop for releasedly holding the line within the small loop, the free end of the wire beyond the large loop being embedded within the body portion and extending longitudinally of the straight longitudinal shank and spaced laterally from such shank, the shank being bent adjacent to the end of the body portion remote from said large loop to form a pair of transversely spaced opposed generally circular loops, said last mentioned loops including a common transversely extending inner side extending across and substantially contacting the adjacent end of the body portion, the loops having inner opposed sides which are spaced apart laterally, and the free end of the wire beyond the loops being embedded within the body portion and extending longitudinally therein in laterally spaced relation to the shank.

ARTHUR M. PETERSON.

REFERENCES CITED

The following references are of record in the file of this patent:

UNITED STATES PATENTS

| Number | Name | Date |
| --- | --- | --- |
| 184,627 | Jones | Nov. 21, 1876 |
| 360,418 | Clark | Apr. 5, 1887 |
| 487,504 | Wickey | Dec. 6, 1892 |
| 660,078 | Moore | Oct. 16, 1900 |
| 735,235 | Foust | Aug. 4, 1903 |
| 852,601 | Floyd | May 7, 1907 |
| 978,519 | Vaughn | Dec. 13, 1910 |
| 1,789,988 | Samuel | Jan. 27, 1931 |
| 2,202,976 | Wise | June 4, 1940 |